United States Patent
Schatz (10) Patent No.: US 6,988,047 B1
(45) Date of Patent: Jan. 17, 2006

(54) METHOD FOR DETERMINING THE INSTANTANEOUS TEMPERATURE OF A MEDIUM

(75) Inventor: Oliver Schatz, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 118 days.

(21) Appl. No.: 10/110,560

(22) PCT Filed: Aug. 26, 2000

(86) PCT No.: PCT/DE00/02919

§ 371 (c)(1),
(2), (4) Date: Oct. 7, 2002

(87) PCT Pub. No.: WO01/29526

PCT Pub. Date: Apr. 26, 2001

(30) Foreign Application Priority Data

Oct. 15, 1999 (DE) ................................ 199 49 815

(51) Int. Cl.
   *G01K 1/00* (2006.01)

(52) U.S. Cl. ...................... 702/130; 123/676; 123/697; 374/144

(58) Field of Classification Search ................ 123/676, 123/697; 374/144; 702/130
See application file for complete search history.

(56) References Cited

U.S. PATENT DOCUMENTS

| | | | |
|---|---|---|---|
| 4,054,730 A | 10/1977 | Crifasi | |
| 4,561,402 A | 12/1985 | Nakano | |
| 4,577,977 A | 3/1986 | Pejsa | |
| 4,708,777 A | * 11/1987 | Kuraoka | ................ 205/784.5 |
| 4,854,730 A | 8/1989 | Fraden | |

FOREIGN PATENT DOCUMENTS

| | | |
|---|---|---|
| DE | 27 57 334 | 7/1979 |
| DE | 250 576 | 10/1987 |
| DE | 38 06 308 | 9/1989 |
| FR | 2 712 980 | 6/1995 |
| FR | 2 771 815 | 6/1999 |
| FR | 2771815 | * 6/1999 |

* cited by examiner

*Primary Examiner*—John Barlow
*Assistant Examiner*—Stephen J. Cherry
(74) *Attorney, Agent, or Firm*—Kenyon & Kenyon (57) ABSTRACT

A method for determining the instantaneous temperature of a medium, the medium surrounding an element able to be electrically heated at least intermittently to a constant, known temperature. It is provided for the instantaneous temperature of the medium to be determined from a heating power supplied to the element.

8 Claims, 3 Drawing Sheets

METHOD FOR DETERMINING THE INSTANTANEOUS TEMPERATURE OF A MEDIUM

The present invention relates to a method for determining the instantaneous temperature of a medium having the features recited in the definition of the species in claim 1.

BACKGROUND INFORMATION

It is known that an ambient temperature, e.g. of a unit of a motor vehicle, is an important auxiliary quantity for a number of control, regulating, and monitoring operations. To process this auxiliary quantity, measuring systems are known via which an instantaneous ambient temperature is able to be measured. For this purpose, temperature sensors are known that, for example, supply a signal proportional to the actual temperature on the basis of temperature-dependent resistances.

It is also known to use gas sensors via which a gas composition of a medium, e.g. of the ambient air, is able to be measured. These gas sensors function, for example, according to the principle of variable resistances, e.g. on a metallic oxide basis, and need an operating temperature for this purpose. Therefore, it is known, to assign the gas sensors a heating element via which the gas sensors are able to be heated to the needed operating temperature.

Such gas sensors are used, for example, in air conditioning systems. In order to be able to perform a temperature measurement at the same time as the gas analysis, it is known to use a combined sensor element that includes the gas sensor as well as a temperature measurement sensor. In this context, it is disadvantageous that this system of two sensors based on different operating principles necessitates complicated adaptive work with regard to the set-up, control, and the like.

SUMMARY OF THE INVENTION

In contrast, the method of the present invention having the features recited in claim 1 provides the advantage that an instantaneous temperature is able to be measured in a simple manner. As a result of an element able to be heated at least intermittently to a constant, known temperature being used such that the instantaneous temperature of the medium surrounding the element is determined from a heating power supplied to the element, it is advantageously possible to dispense with the mounting of an additional temperature measurement sensor. Thus, the design of such sensor elements is significantly simplified. In addition to the material savings connected with this and a reduction in manufacturing costs, such sensor have a simpler design, so that they are able to be used in diverse applications without a significant need for adaptation.

In a preferred refinement of the present invention, it is provided that the heating power used to determine the instantaneous temperature is ascertained from a measured heating voltage and a measured heating current. Therefore, an operating parameter that is proportional to the ambient temperature is provided in a simple manner on the basis of known relationships according to which the heating power is the product of the heating voltage and the heating current. Using algorithms preferably able to be processed by microprocessors, the heating power to be introduced to reach the necessary, known, constant operating temperature of the heating element is evaluated as a measure of the instantaneous temperature of the medium on the basis of a known initial temperature of the sensor recording the heating power and of known geometry constants, e.g. in particular the heat transfer resistance to the medium. In a particularly preferred refinement of the present invention, the relationship of heating power to ambient temperature is able to be stored in a table in a storage means assigned to the microprocessor, so that when measuring a certain heating power, it is able to be immediately assigned to the instantaneous temperature of the medium given for it.

In an additional preferred refinement of the present invention, it is provided for the heating power to be determined from a pulse duty factor of a closing frequency of the heating voltage. It is known per se to switch on the heating voltage in a timed manner in order to reach a constant heating temperature, so that the resulting pulse duty factor provides a quantity proportional to the supplied heating power. This pulse duty factor of the heating voltage is known for regulating the temperature of the heating element and is consequently able to be tapped off in a simple manner and used for determining the instantaneous temperature of the medium.

In a further preferred refinement of the present invention, it is provided for the heating power to be determined from a time span that occurs between a switching-off time of a heating voltage and a re-closing time of the heating voltage during a two-step control. It is known per se to set a certain heating temperature in that the limiting temperature values being exceeded or not met is measured via a two-step control, and the heating voltage is switched off when the values are exceeded and switched on when they are not met. As a result, a heating temperature in the range defined by the limiting temperature values is maintained. The resulting time span between the switching-off of the heating voltage and the switching back on of the heating voltage is a signal that is proportional to the supplied heating power for maintaining the heating temperature and that is evaluated in a simple manner and may be used as a measure for the instantaneous temperature of the medium.

It is clear that measured quantities proportional to the heating power are tapped off in a simple manner using the method of the present invention, and a signal proportional to the instantaneous temperature of the surrounding medium is able to be determined from this on the basis of known constants of the system. The design approach is able to be implemented in a simple manner in existing control units or the like, so that an additional expenditure for structural elements is not necessary.

Further preferred embodiments of the present invention follow from the remaining features specified in the subclaims.

BRIEF DESCRIPTION OF THE DRAWINGS

In the following, the present invention is explained in greater detail in the light of exemplary embodiments with reference to the appertaining drawings. The figures show.

DESCRIPTION OF THE EXEMPLARY EMBODIMENTS

Figure 1:
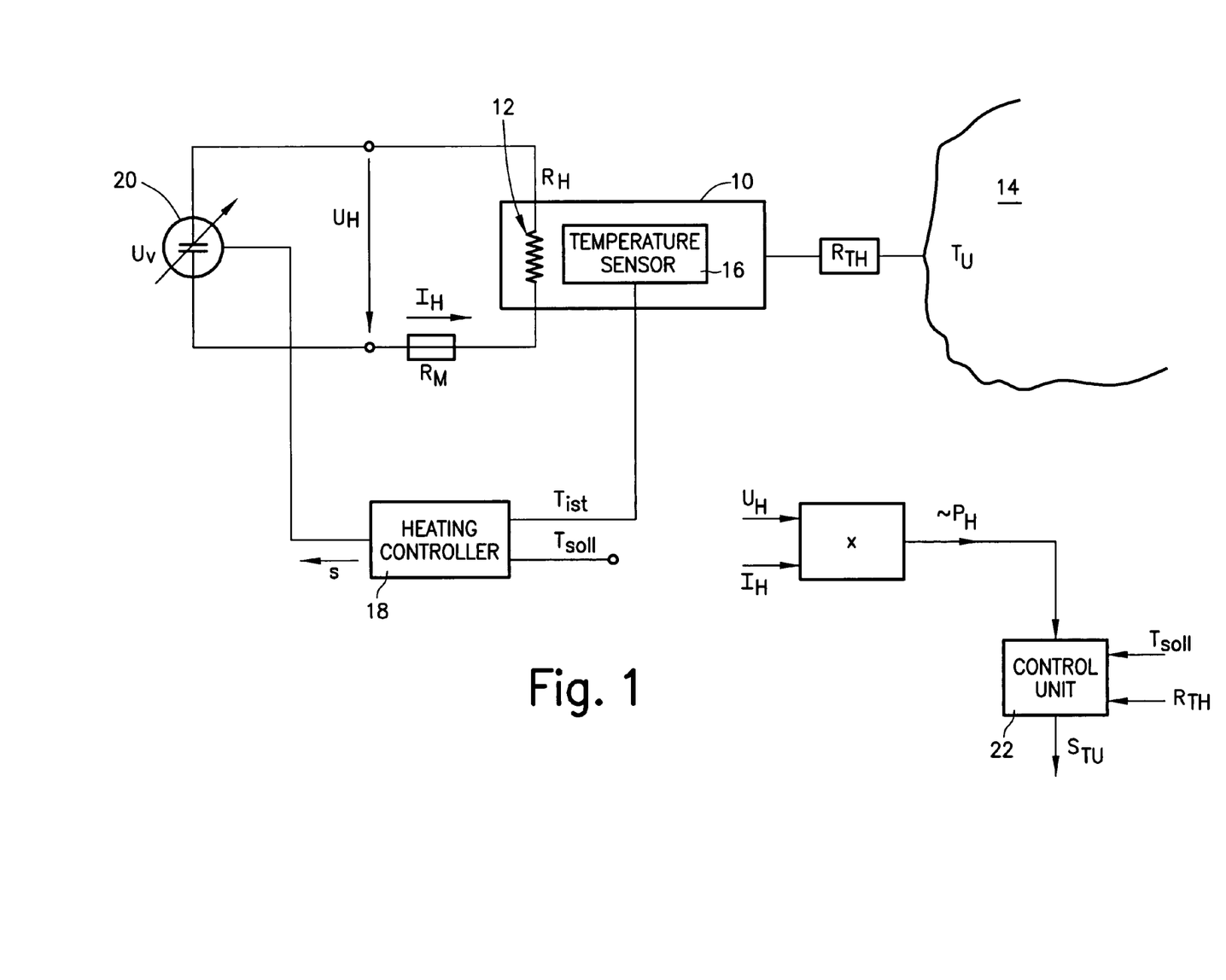
FIG. 1 a circuit configuration for determining an instantaneous temperature in a first variant of an embodiment.

The exemplary embodiments explained below start out from a gas sensor element 10 to which an internal heating device 12 is assigned for reaching an operating temperature of gas sensor element 10. Heating device 12 is formed by an electrical heating resistor RH. The design and operating mode of such gas sensor elements 10 are generally known, so that this is not described in greater detail within the framework of the present description.

Gas sensor element 10 is assigned to a medium 14, e.g. the air in an interior space of a motor vehicle, the interior space of a building, or any general measuring point. This medium 14 has an instantaneous ambient temperature $T_U$. In the following explanation of the exemplary embodiments, it is assumed that a measuring signal corresponding to instantaneous ambient temperature $T_U$ is to be determined and to be used as an auxiliary quantity for additional control, regulating, or monitoring functions.

Gas sensor element 10 has a known design and is configured such that its gas-sensitive regions are optimally coupled to medium 14. This results in a known thermal transfer resistance $R_{TH}$ between gas sensor element 10 and medium 14. Heating element 12 is assigned to the gas-sensitive regions of gas sensor element 10, so that a minimal as possible heating power $P_H$ is needed to be able to bring gas sensor element 10 to the necessary operating temperature of, e.g. greater than 300° C. To achieve this, a thermal capacitance of gas sensor element 10 is as low as possible, and a thermal leakage resistance of gas sensor element 10 is as great as possible. As a result, it is possible to quickly reach the necessary operating temperature while the dissipation heat of gas sensor element 10 emitted into the surrounding medium is low.

These initial considerations result in heating power $P_H$ supplied to gas sensor element 10 being viewed in direct connection with ambient temperature $T_U$ of medium 14. On the basis of the known geometry of gas sensor element 10, its thermal capacitance, its thermal leakage resistance, and the thermal transfer resistance to medium 14 are known and may be used as constants when determining ambient temperature $T_U$.

Assigned to gas sensor element 10 is a temperature sensor 16 via which an actual temperature $T_{actual}$ of gas sensor element 10 is measured. This actual temperature $T_{actual}$ is provided to a heating controller 18. Heating controller 18 compares temperature $T_{actual}$ to a temperature $T_{setpoint}$ for gas sensor element 10 and supplies a control signal S, with which a voltage source 20 is controllable, as a function of a difference $T_{setpoint}-T_{actual}$. A level of supply voltage $U_V$ for heating element 12 of gas sensor element 10 is controlled via control signal S. Heating voltage $U_H$ and heating current $I_H$, which flows over a measuring resistor $R_M$, are able to be continuously determined from this instantaneous supply voltage $U_V$ via measuring means not shown in detail. Instantaneous heating power $P_H$ is able to be determined on the basis of the known relationship heating power $P_H$=heating voltage $U_H$·heating current $I_H$. As described above, this instantaneous heating power $P_H$ is a function of instantaneous temperature $T_U$. Using a control unit 22 indicated here, which obtains instantaneous heating power $P_H$, setpoint temperature $T_S$ of gas sensor element 10, and thermal transfer resistance $R_{TH}$ between gas sensor element 10 and medium 14 as input quantities, a control signal $S_{TU}$ corresponding to instantaneous ambient temperature $T_U$ of medium 14 is made available on the basis of the relationship $T_U=T_{setpoint}-R_{TH}\cdot P_H$.

The consideration of temperature $T_{setpoint}$ of gas sensor element 10 assumes that via heating controller 18, actual temperature $T_{actual}$ of gas sensor element 10 essentially corresponds to setpoint temperature $T_{setpoint}$.

Figures 2, 3:
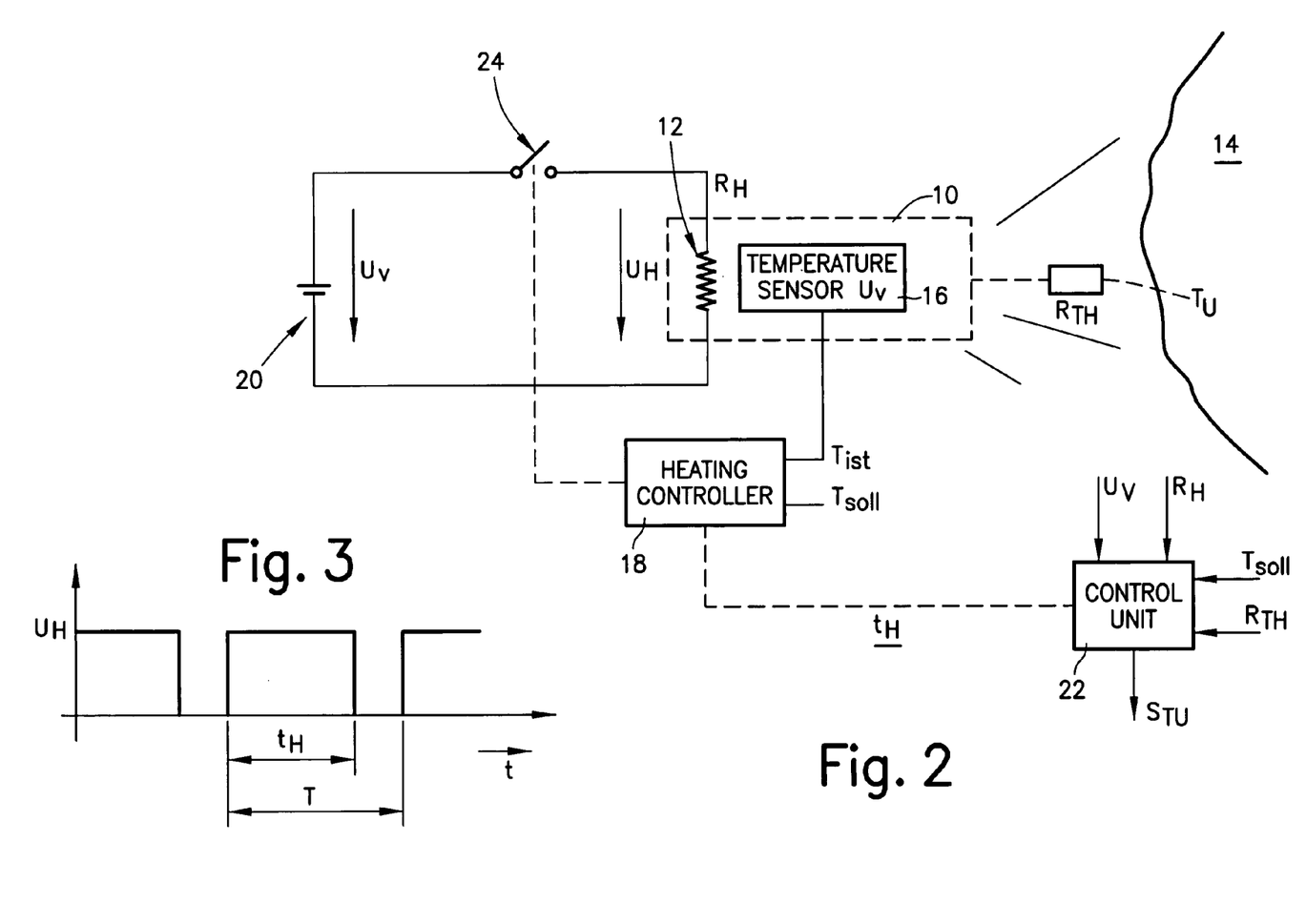
FIG. 2 a circuit configuration for determining an instantaneous temperature in a second variant of an embodiment.
FIG. 3 a signal pattern of a heating voltage.

FIG. 2 explains a second variant of an embodiment for determining instantaneous ambient temperature $T_U$ of medium 14. Parts that are the same as in FIG. 1 are provided with identical reference numerals and are not explained again. According to the circuit configuration known per se and shown in FIG. 2, supply voltage source 20 is operated by a constant supply voltage $U_V$. Heating voltage $U_H$ for keeping gas sensor element 10 at setpoint temperature $T_{setpoint}$ is regulated by controlling a circuit element 24 in a clocked manner via heating controller 18. As FIG. 3 shows, as a result of a pulse duty factor of heating controller 18 heating voltage $U_H$ is applied for a heating duration $t_H$. While this heating voltage $U_H$ is being applied, heating element 12 heats up until temperature sensor 16 signals that temperature $T_{setpoint}$ has been reached. Depending on whether ambient temperature $T_U$ of medium 14 decreases or increases, a more or less large heating power $P_H$ of heating element 12 is necessary for gas sensor element 10 to be able to be adjusted to its known constant operating temperature. This heating power results from the pulse duty factor of heating time $t_H$ to a total heating period T. This heating regulation is known per se. A resulting pulse duty factor $$\frac{t_H}{T}$$

is consequently directly dependent on ambient temperature $T_U$. The pulse duty factor $$\frac{t_H}{T}$$

is tapped off and supplied to control unit 22. Supply voltage $U_V$, heating resistance $R_H$, setpoint temperature $T_{setpoint}$, and thermal transfer resistance $R_{TH}$ are available to control unit 22 as additional known constant input quantities.

On the basis of the relationship $$T_U = T_S - R_{TH} \cdot \frac{U^2}{R_H} \cdot \frac{t_H}{T}$$

a control signal $S_{TU}$, which is directly proportional to instantaneous ambient temperature $T_U$, is able to be provided on the basis of the known quantities and instantaneous pulse duty factors $$\frac{t_H}{T}.$$

Figure 4:
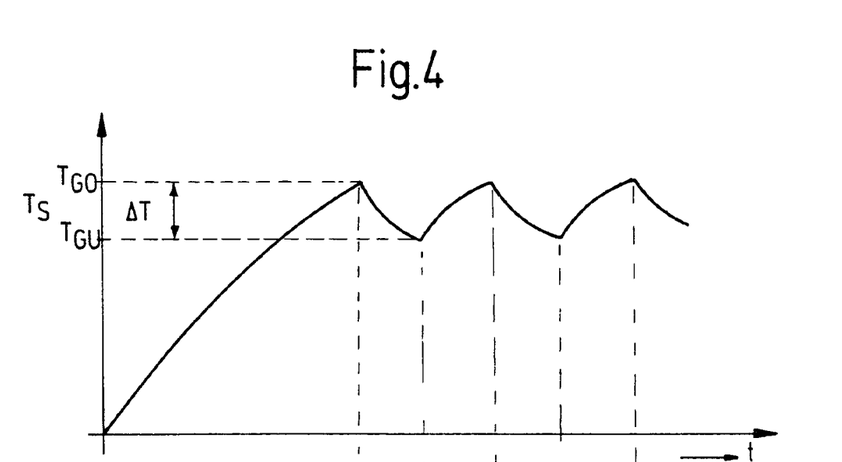
FIG. 4 a temperature progression of a known heating temperature.
Figure 5:
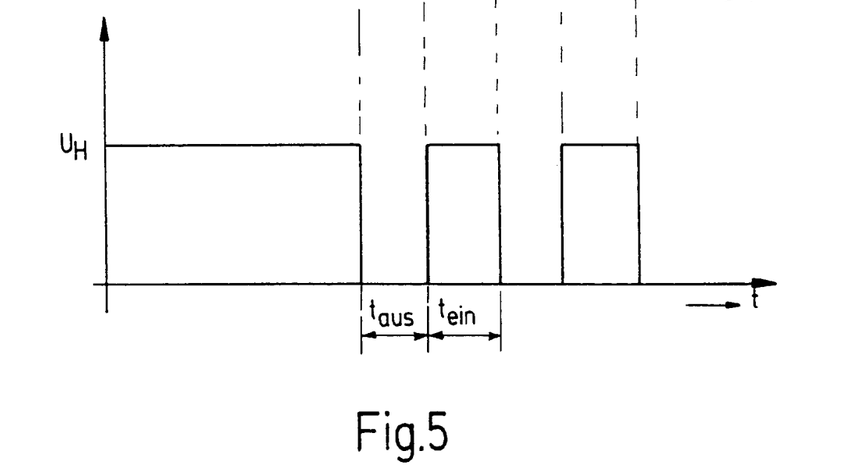
FIG. 5 a curve of a heating voltage resulting from the temperature progression according to FIG. 4.

The circuit configuration according to FIG. 2 is able to be operated in a manner known per se via a so-called two-step control. In this context, sensor temperature $T_S$ is controlled between a top limiting value $T_{GO}$ and a bottom limiting value $T_{GU}$ via heating controller 18 by controlling heating voltage $U_H$. Temperature $T_{actual}$ is determined via temperature sensor 16 and supplied to heating controller 18. The heating controller compares temperature $T_{actual}$ with top limiting value $T_{GO}$ and with bottom limiting value $T_{GU}$, respectively. If temperature $T_{actual}$ reaches top limiting value $T_{GO}$ circuit element 24 is switched off by heating controller 18, while when bottom limiting value $T_{GU}$ is reached by actual temperature $T_{actual}$, circuit element 24 is switched on. This results in the characteristic curve of sensor temperature $T_S$ shown in FIG. 4. Defining top limiting value $T_{GO}$ and bottom limiting value $T_{GU}$ results in a temperature hysteresis $\Delta T$ of heating element 12. This results in the switching-off times $t_{off}$ of circuit element 46 shown in FIG. 5 and corresponding switching-on times $t_{on}$ of circuit element 24. According to this, heating voltage $U_H$ is also clocked as a function of the characteristic curve of temperature hysteresis $\Delta T$. For time $t_{off}$ the following relationship applies $$t_{off} = -\tau \cdot l_n\left(1 - \frac{\Delta T}{T_{GO} - T_U}\right)$$

where $\tau$ is a thermal time constant of gas sensor element 10. On the basis of known time constant $\tau$ and known temperature hysteresis $\Delta T$ as well as known top limiting temperature $T_{GO}$, switching-off time $T_{off}$ is directly dependent on instantaneous ambient temperature $T_U$ of medium 14. A signal $S_{TU}$ corresponding to ambient temperature $T_U$ is consequently able to be provided via control unit 22.

It becomes clear that a necessary heating power $P_H$ or heating voltage $U_H$ is able to be directly used for determining ambient temperature $T_U$ via simple method steps from measured values or constants known per se of a gas sensor element 10.

Of course, the present invention is not restricted to the represented exemplary embodiment. Thus, it is presupposed in the description of the exemplary embodiment that gas sensor element 10 is operated at a heating temperature that is constant over time. This heating temperature may also be variable with respect to time. Taking temperature $T_{setpoint}$ or then changed top limiting value $T_{GO}$ into consideration also makes it possible to reach a setpoint temperature that is variable over time when determining instantaneous ambient temperature $T_U$ in a simple manner. Moreover, the use of the method of the present invention for determining ambient temperature $T_U$ is not limited to gas sensor elements. It is crucial for an element, e.g., a voltage reference, a time/frequency standard, or the like, able to be heated at least intermittently to a constant, known temperature to be present. The heating power to be supplied in order to reach the at least intermittently constant, known temperature is then used as an output variable for determining instantaneous ambient temperature $T_U$.

What is claimed is:

1. A method for determining an instantaneous temperature of a medium, comprising:
   regulating a temperature of an element surrounded by the medium to a constant, known temperature by electrically heating the element, at least intermittently;
   determining the heating power from a pulse duty factor of a closing frequency of the heating voltage; and
   determining the instantaneous temperature of the medium from a heating power supplied to the element, the heating power being adjusted as a function of one of:
   i) a difference between an actual temperature of the element and a setpoint temperature of the element, and
   ii) a difference between the actual temperature of the element and a limiting value of the temperature, the limiting value being one of a top and bottom limiting value of the temperature.

2. The method as recited in claim 1, further comprising:
   determining the heating power from a measured heating voltage and a measured heating current.

3. A method for determining an instantaneous temperature of a medium, comprising:
   regulating a temperature of an element surrounded by the medium to a constant, known temperature by electrically heating the element, at least intermittently;
   determining the instantaneous temperature of the medium from a heating power supplied to the element, the heating power being adjusted as a function of one of:
   i) a difference between an actual temperature of the element and a setpoint temperature of the element, and
   ii) a difference between the actual temperature of the element and a limiting value of the temperature, the limiting value being one of a top and bottom limiting value of the temperature; and
   determining the heating power from a time span between a switching-off time of the heating voltage and a re-closing time of the heating voltage during a two-step control of a temperature of the element.

4. The method as recited in claim 2, further comprising:
   comparing the determined heating power to known constant parameters of the element; and
   providing a signal proportional to the instantaneous temperature based on the comparison.

5. The method as recited in claim 4, wherein at least one of a setpoint temperature of the element, thermal transfer resistance to the medium, supply voltage, and heating resistance is used as constants of the element.

6. The method as recited in claim 1, further comprising:
   changing the constant, known temperature.

7. A method for determining an instantaneous temperature of a medium, comprising:
   regulating a temperature of an element surrounded by the medium to a constant, known temperature by electrically heating the element, at least intermittently;
   determining the instantaneous temperature of the medium from a heating power supplied to the element, the heating power being adjusted as a function of one of:
   i) a difference between an actual temperature of the element and a setpoint temperature of the element, and
   ii) a difference between the actual temperature of the element and a limiting value of the temperature, the limiting value being one of a top and bottom limiting value of the temperature; and
   generating a control signal corresponding to the instantaneous temperature of the medium, the control signal being generated as a function of the setpoint temperature of the element minus the product of a heating power supplied to the element and a thermal transfer resistance between a gas sensor element and the medium.

8. A method for determining an instantaneous temperature of a medium, comprising:

regulating a temperature of an element surrounded by the medium to a constant, known temperature by electrically heating the element, at least intermittently;

determining the instantaneous temperature of the medium from a heating power supplied to the element, the heating power being adjusted as a function of one of:
        i) a difference between an actual temperature of the element and a setpoint temperature of the element, and
        ii) a difference between the actual temperature of the element and a limiting value of the temperature, the limiting value being one of a top and bottom limiting value of the temperature; and     generating a control signal corresponding to the instantaneous temperature of the medium, the control signal being generated as a function of the setpoint temperature of the element minus the product of a pulse duty factor of a closing frequency of the heating voltage, a thermal transfer resistance between a gas sensor element and the medium, and a heating voltage squared divided by a heating resistance.

\* \* \* \* \*

UNITED STATES PATENT AND TRADEMARK OFFICE
CERTIFICATE OF CORRECTION

| | |
|---|---|
| PATENT NO. | : 6,988,047 B1 |
| APPLICATION NO. | : 10/110560 |
| DATED | : January 17, 2006 |
| INVENTOR(S) | : Oliver Schatz |

It is certified that error appears in the above-identified patent and that said Letters Patent is hereby corrected as shown below:

Column 1, line 4, insert heading --FIELD OF THE INVENTION--

Column 1, line 6, delete "having the features recited in the definition of species in claim 1"

Column 1, line 11, change "It is known that an ambient temperature, e.g." to -- An ambient temperature, e.g.--

Column 1, line 13, change "measuring systems" to --conventional measuring systems--

Column 1, line 14, delete "are known via which"

Column 1, line 15, change "an instantaneous ambient temperature is able to be measured." to --measure an instantaneous ambient temperature.--

Column 1, line 16, change "temperature sensors are known that," to --conventional temperature sensors,--

Column 1, line 20, delete "It is also known to use gas sensors via which a" and insert --Conventionally, gas sensors measure--

Column 1 line 21, change "e.g. of the ambient air, is able to be measured." to --e.g., of the ambient air.--

Column 1, line 23, change "e.g. on a" to --e.g., on a--

Column 1, line 25, change "Therefore, it is known, to assign the gas sensors" to --Therefore, conventionally the gas sensors are assigned--

Column 1, line 30, delete "it is known to use"

Column 1, line 31, change "sensor element" to --sensor element may be used--

Column 1, line 38, change "SUMMARY OF THE INVENTION" to --SUMMARY--

Column 1, line 40, change "In contrast, the method of" to --An example method according to--

Column 1, line 41, delete "having the features recited in claim 1 provides" and insert --may have--

UNITED STATES PATENT AND TRADEMARK OFFICE
CERTIFICATE OF CORRECTION

PATENT NO. : 6,988,047 B1
APPLICATION NO. : 10/110560
DATED : January 17, 2006
INVENTOR(S) : Oliver Schatz It is certified that error appears in the above-identified patent and that said Letters Patent is hereby corrected as shown below:

Column 1, line 52, change "such sensor have" to --such sensor elements have--

Column 1, line 55, change "In a preferred refinement" to --In one refinement--

Column 1, line 56, delete "it is provided that"

Column 1, line 63, delete "preferably"

Column 2, line 2, change "e.g. in particular" to --e.g., in particular--

Column 2, line 3, delete "particularly preferred"

Column 2, line 5, delete "able to be"

Column 2, line 7, change "it is able to be" to --it may be--

Column 2, line 10, change "In an additional preferred refinement" to --In another refinement--

Column 2, line 11, delete "it is provided for" and change "to be determined" to --is determined--

Column 2, line 13, change "It is known per se to switch on the heating voltage" to --The heating voltage may be switched on--

Column 2, line 23, delete "it is provided for" and change "to be determined" to --may be determined--

Column 2, line 26, change "It is known per se to set a certain" to --A certain--

Column 2, line 27, change "temperature in that" to --temperature is set so that--

Column 2, line 28, change "is measured" to --are measured--

Column 2, line 39, change "It is clear that measured quantities" to --Measured quantities--

Column 2, line 41, change "method of the present invention" to --example method of the present invention--

Column 2, line 43, delete "able to be"

UNITED STATES PATENT AND TRADEMARK OFFICE
CERTIFICATE OF CORRECTION

PATENT NO.        : 6,988,047 B1
APPLICATION NO.   : 10/110560
DATED             : January 17, 2006
INVENTOR(S)       : Oliver Schatz It is certified that error appears in the above-identified patent and that said Letters Patent is hereby corrected as shown below:

Column 2, lines 49-51, delete "Further preferred... in the subclaims."

Column 2, line 57, delete "The figures show:"

Column 2, line 58, change "FIG. 1 a circuit" to --FIG. 1 shows a circuit--

Column 2, line 59, change "in a first variant of an embodiment;" to --in a first example embodiment.--

Column 2, line 60, change "FIG. 2 a circuit" to --FIG. 2 shows a circuit--

Column 2, line 61, change "in a second variant of an embodiment;" to --in a second example embodiment--

Column 2, line 63, change "FIG. 3 a signal pattern" to --FIG. 3 shows a signal pattern--

Column 2, line 64, change "FIG. 4 a temperature" to --FIG. 4 shows a temperature--

Column 2, line 65, change "temperature; and" to --temperature.--

Column 2, line 66, change "FIG. 5 a curve" to --FIG. 5 shows a curve--

Column 3, line 1, change "DESCRIPTION OF THE EXEMPLARY EMBODIMENTS" to --DETAILED DESCRIPTION--

Column 3, line 10, change "are severally known," to --are generally conventional--

Column 3, line 13, change "e.g. the" to --e.g., the--

Column 3, line 22, change " a known design" to --a conventional design--

Column 3, line 41, change "the known geometry" to --the geometry--

Column 4, line 6, change "element 10 essentially" to --element 10 generally--

Column 4, line 12, delete "known per se and"

Column 4, line 24, change "a more or less large" to --a generally large--

UNITED STATES PATENT AND TRADEMARK OFFICE
CERTIFICATE OF CORRECTION

PATENT NO. : 6,988,047 B1
APPLICATION NO. : 10/110560
DATED : January 17, 2006
INVENTOR(S) : Oliver Schatz It is certified that error appears in the above-identified patent and that said Letters Patent is hereby corrected as shown below:

Column 4, line 29, change "is known per se." to --is conventional.--

Column 4, line 67, change "in a manner known per se" to --in a conventional manner--

Signed and Sealed this

Thirteenth Day of November, 2007

JON W. DUDAS
*Director of the United States Patent and Trademark Office*